US009629179B2

United States Patent
Wang et al.

(10) Patent No.: US 9,629,179 B2
(45) Date of Patent: Apr. 18, 2017

(54) METHOD AND DEVICE FOR PROCESSING LOCAL ACCESS CONNECTION

(71) Applicant: ZTE Corporation, Shenzhen (CN)

(72) Inventors: Jing Wang, Shenzhen (CN); Shuang Liang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 162 days.

(21) Appl. No.: 14/371,047

(22) PCT Filed: Dec. 24, 2012

(86) PCT No.: PCT/CN2012/087282
§ 371 (c)(1),
(2) Date: Jul. 8, 2014

(87) PCT Pub. No.: WO2013/104248
PCT Pub. Date: Jul. 18, 2013

(65) Prior Publication Data
US 2014/0348069 A1    Nov. 27, 2014

(30) Foreign Application Priority Data
Jan. 10, 2012 (CN) .......................... 2012 1 0006239

(51) Int. Cl.
*H04W 74/02*    (2009.01)
*H04W 76/06*    (2009.01)
(Continued)

(52) U.S. Cl.
CPC ......... *H04W 74/02* (2013.01); *H04L 41/0816* (2013.01); *H04W 8/08* (2013.01);
(Continued)

(58) Field of Classification Search
CPC ........... H04W 8/08; H04W 8/20; H04W 8/02; H04W 8/082; H04W 8/186; H04W 28/08;
(Continued)

(56) References Cited

U.S. PATENT DOCUMENTS 8,937,924 B2 * 1/2015 Choi .................. H04W 76/062
370/252
9,084,093 B2 * 7/2015 Watfa .................... H04W 8/082
(Continued)

FOREIGN PATENT DOCUMENTS

CN    101646248 A    2/2010
CN    101931926 A    12/2010
(Continued)

OTHER PUBLICATIONS

3GPP et al., "3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.6.0 (Dec. 2011); Dec. 2011; downloaded on Aug. 26, 2016.*

(Continued)

*Primary Examiner* — Brian O'Connor
(74) *Attorney, Agent, or Firm* — Banner & Witcoff, Ltd.

(57) ABSTRACT

A method for processing local access connections is provided. When a user terminal is in a connected state and accesses through a hybrid mode home nodeB, a mobility management entity of a core network detects that closed subscriber group (CSG) membership of the user terminal changes or times out (401). The mobility management entity of the core network initiates releasing of all the activated local access packet data network (PDN) connections or notifies the home nodeB to trigger a local gateway to initiate releasing of all the activated local access PDN connections (402).

15 Claims, 7 Drawing Sheets

(51) Int. Cl.
*H04L 12/24* (2006.01)
*H04W 8/08* (2009.01)
*H04W 74/08* (2009.01)
*H04W 8/18* (2009.01)
*H04W 76/00* (2009.01)

(52) U.S. Cl.
CPC ..... *H04W 74/0808* (2013.01); *H04W 76/062* (2013.01); *H04W 8/186* (2013.01); *H04W 76/002* (2013.01); *H04W 76/068* (2013.01)

(58) Field of Classification Search
CPC . H04W 48/20; H04W 74/02; H04W 74/0808; H04W 76/062; H04W 76/002; H04W 76/068; H04W 76/007; H04L 1/0186
See application file for complete search history.

(56) References Cited

U.S. PATENT DOCUMENTS

| | | | | |
|---|---|---|---|---|
| 2012/0257598 A1* | 10/2012 | Karampatsis | ......... | H04W 8/082 370/331 |
| 2013/0308527 A1* | 11/2013 | Chin | ............ | H04W 76/06 370/328 |
| 2014/0003241 A1* | 1/2014 | Kim | ............ | H04W 36/22 370/235 |
| 2014/0119340 A1* | 5/2014 | Stojanovski | ......... | H04W 8/082 370/331 |

FOREIGN PATENT DOCUMENTS

| | | |
|---|---|---|
| CN | 101998404 A | 3/2011 |
| CN | 102111903 A | 6/2011 |
| CN | 102724769 A | 10/2012 |

OTHER PUBLICATIONS

International Search Report of PCT/CN2012/087282 dated Mar. 28, 2014.
Supplementary European Search Report of EP12865098, dated Oct. 30, 2015.
3GPP TSG SA WG2 Meeting #72, TD S2-092208, Mar. 30-Apr. 3, 2009, Hangzhou, P.R. China, Source: Huawei, Title: Allowed CSG List Handling, Document for Approval/Discussion, Agenda Item 7.4.1, 3 pages.
3GPP TSG SA WG2 Meeting #72, TD S2-092653, Mar. 30-Apr. 3, 2009, Hangzhou, P.R. China, Source: Huawei, Title: Allowed CSTG List Handling, Document for Approval/Discussion, Agenda Item 7.4.1, 3 pages.
3GPP TS 23.401 V110.0.0 (Dec. 2011), 3rd Generation Partnership Project; Technical Specification Group Services and System Aspects; General Packet Radio Service (GPRS) enhancements for Evolved Universal Terrestrial Radio Access Network (E-UTRAN) Access (Release 11).
3GPP TSG-RAN WG3 Meeting #67, San Francisco, USA, Feb. 22-26, 2010, Agenda 14, Source: Huawei, Title: Discussion on CSG Membership/Subscription Updating for non CSG UEs, Document for Discussion and Approval.

* cited by examiner

METHOD AND DEVICE FOR PROCESSING LOCAL ACCESS CONNECTION

TECHNICAL FIELD

The present document relates to the field of mobile communication, and more specifically, to a method and device for processing a local access connection in the case of using local access functions (including local IP access and selected IP Traffic Offload).

BACKGROUND OF THE RELATED ART

In order to maintain competitive capability of the third generation mobile communication system in the field of communication, provide users with faster speed, shorter delay, and more personalized mobile services, and meanwhile reduce the operator's operating costs, the 3rd Generation Partnership Project (referred to as 3GPP) standards working group is working on the Evolved Packet system (Evolved Packet System, referred to as EPS) research. FIG. 1 shows the structural diagram of the evolved packet domain system, and as shown in FIG. 1, the entire EPS system is divided into two parts: a radio access network and a core network. The core network comprises home subscriber server (referred to as HSS), mobility management entity (referred to as MME), Serving GPRS Support Node (referred to as SGSN), policy and charging rule function (referred as PCRF), serving gateway (referred to as S-GW), packet data network gateway (PDN Gateway, referred to as P-GW) and packet Data Network (referred to as PDN). In the following, the function of each part will be described in detail.

The home subscriber server is a permanent storage site for user subscription data and is located at the user subscribed home network.

The mobility management entity is a storage site for the user subscription data in the current network, and is responsible for the terminal-to-network non-access layer signaling management, terminal security authentication function, terminal mobility management, tracking and paging management function in the user idle mode, and bearer management.

The serving GPRS support node is a service support node for users in the Global System for Mobile Communications (referred to as GSM) Enhanced Data Rate for GSM Evolution (referred to as EDGE) Radio Access Network (referred to as GERAN) and the Universal Mobile Telecommunications System (referred to as UMTS) terrestrial radio access network (referred to UTRAN) to access the core network, it is similar to the mobility management entity in functionality, and responsible for user location update, paging management, bearer management, and other functions.

The serving gateway is a gateway from the core network to the radio system and is responsible for the user plane bearer from the terminal to the core network, data buffering in the terminal idle mode, function of initiating a service request by the network side, lawful interception, packet data routing and forwarding function; the serving gateway is responsible for collecting the cases of the user terminal using the radio network, producing the charging bill of the terminal using the radio network, and sending it to the charging gateway.

The packet data gateway is a gateway of the LTE system and the external packet data network of the system, it connects with the Internet and the packet data network, and is responsible for Internet protocol (referred to as IP) address allocation, charging function, packet filtering and policy control of the terminal, etc.

The packet data network is an operator's IP service network, and the network provides IP services to users through the operator's core network.

The policy and charging rule function entity is a server responsible for providing the charging control, online credit control, threshold control, and Quality of Service (referred to as QoS) policy rule in the evolved system.

The radio access network consists of an Evolved NodeB (referred to as eNB) and a 3G radio network controller (referred to as RNC), and it is mainly responsible for transmitting and receiving radio signals, contacting with the terminal over the air interface, managing the radio resources of the air interface, resource scheduling and access control.

The serving GPRS support node is an upgraded SGSN, and it supports the S4 interface to the serving gateway, and interacts with the mobility management entity MME by using the GPRS Tunneling Protocol Version 2 (referred to as GTPv2). For the SGSN supporting the 3G core network, the packet switching (referred to as PS) domain network architecture is different from what is shown in FIG. 1. At this point, the SGSN and the MME are connected via the Gn interface, and the interaction uses the GPRS Tunneling Protocol version 1 (referred to as GTPv1). The SGSN cannot connect with the serving gateway, but it directly accesses to the packet data network by connecting to the gateway GPRS support node (referred to as GGSN) via the Gn interface.

The Home NodeB (referred to as the HNB) or Home eNodeB (referred to as HeNB) is a type of a small, low power nodeB, and works as some users' dedicated resources deployed in families, groups, corporations, colleges, or other private places for use, it is primarily used to provide the users with higher-speed services and reduce the cost required for using the high-speed services, and meanwhile compensate for the lack in coverage of the distributed cellular wireless communication system. Advantages of the home nodeB are that it is affordable, convenient, has low power output, plug and play, and broadband access, and uses single-mode terminals.

The home nodeB can directly connect to the core network, as shown in FIG. 2a, or access to the core network through the logic network element, i.e. home nodeB gateway, as shown in FIG. 2b, wherein, the main functions of the home nodeB gateway are: authenticating the home nodeB's security, dealing with the home nodeB's registration, operating, maintaining and managing the home nodeB, and configuring and controlling the home nodeB according to the operator requirements, and being responsible for exchanging data between the core network and the home nodeB.

In order to achieve the local access functions (including local IP access (referred to as LIPA) or Selected IP Traffic Offload (referred to as SIPTO), i.e., for a local access by the terminal to other IP devices in the home network, the IP devices in the corporate network, or the Internet, a local gateway is added, as shown in FIG. 3. The addition of the local access gateway provides a strong support for local access technology, and the local gateway can be located at the same place of the network element in the radio network or in the vicinity of the network element in the radio network (i.e. external). The local gateway comprises a local PGW (referred to as L-GW), a local GGSN (referred to as L-GGSN), and has partial PGW and GGSN functionality.

In the mobile communications network architecture, the data flow paths of the local access and the traditional core network access are shown in FIG. 3. For users supporting the local access, the traditional core network access data path and the local access data path can be established simultaneously. For the local access connection, the local access data path is from the terminal to the network element at the radio side, and then to the local access gateway (such as L-PGW and L-GGSN), and further access to the local network resources, and the data traffic does not go through the core network. In order to achieve the local access of the terminal to other IP devices in the home network or the Internet, two connections can be created, the first local access data path directly accesses to the Internet (Internet IP connection, that is, SIPTO connection). The second local access data path directly accesses to other IP devices in the home network (home network IP connection, that is, LIPA connection).

The local network resources composed of IP devices in a home or corporate network are only used by users who are authorized to access the local network, and such users have local access subscription information stored in the HSS. When a user is a connected state, if the local access subscription information dynamically changes, there is no solution on how the network deals with the local access connections that have already been activated.

SUMMARY OF THE INVENTION

The technical problem to be solved by the present document is to provide a method and device for processing local access connections, so as to provide a scheme for processing the local access connections when local access subscription information changes.

To solve the above-mentioned technical problem, the present document provides a method for processing local access connections, comprising:

when a user terminal is in a connected state and accesses through a hybrid-mode home nodeB, if a mobility management entity of a core network detects that a closed subscriber group (CSG) membership of the user terminal changes or times out, the mobility management entity of the core network initiates releasing of affected local access packet data network (PDN) connections, or notifies the home nodeB to trigger a local gateway to initiate releasing of the affected local access PDN connections.

Preferably, the CSG membership of the user terminal changing or timing out, comprises: the user terminal changing from a CSG subscriber to a non-CSG subscriber.

Preferably, the released local access PDN connections comprise: all activated local access PDN connections, or local access PDN connections corresponding to an access point name (APN) binding with the CSG.

Preferably, the mobility management entity of the core network notifying the home nodeB to trigger a local gateway to initiate releasing of the local access PDN connections, comprises:

the mobility management entity notifying the home nodeB to trigger the local gateway to initiate releasing of the local access PDN connections via an instruction in an S1 message or an Iu interface message.

Preferably, the S1 message comprises: an evolved radio access bearer modification request message; the Iu interface message comprises: a radio access bearer modification request message.

Preferably, the instruction comprises: information of the current CSG membership of the user terminal;

after the home nodeB receives the instruction, if it determines that the CSG membership of the user terminal changed through a comparison, it triggers the local gateway to initiate releasing of the local access PDN connections.

Preferably, the instruction comprises: a local access deactivation instruction; wherein, after the home nodeB receives the instruction, it directly triggering the local gateway to initiate releasing of the local access PDN connections.

To solve the above-mentioned technical problem, the present document further provides a device for processing local access connections, comprising a detection module and a packet data network (PDN) connection release module, comprising:

the detection module is configured to: when a user terminal is in a connected state and accesses through a hybrid mode home nodeB, detect whether closed subscriber group (CSG) membership the user terminal changes or times out or not;

the PDN connection release module is configured to: when the detection module detects that the CSG membership of the user terminal changes or times out, initiate releasing of affected local access PDN connections, or notify the home nodeB to trigger a local gateway to initiate releasing of the affected local access PDN connections.

Preferably, the CSG membership of the user terminal changing or timing out, comprises: the user terminal changes from a CSG subscriber to a non-CSG subscriber.

Preferably, the released local access PDN connections comprise: all activated local access PDN connections, or local access PDN connections corresponding to the APN binding with the CSG.

Preferably, the PDN connection release module is configured to: notify the home nodeB to trigger the local gateway to initiate releasing of the local access PDN connections by means of: the PDN connection release module notifying the home nodeB to trigger the local gateway to initiate releasing of the local access PDN connections via an instruction in an S1 message or an Iu interface message.

Preferably, the S1 message comprises: an evolved radio access bearer modification request message; the Iu interface message comprises: a radio access bearer modification request message.

Preferably, the instruction comprises: information of the CSG membership of the user terminal or a local access deactivation instruction.

With the method and device in accordance with embodiments of the present document, when the local access subscription information changes dynamically, especially when the user terminal changes from a CSG subscriber to a non-CSG subscriber, the network side can release the local access connections, thus to avoid unnecessary resource waste.

BRIEF DESCRIPTION OF DRAWINGS

The accompanying figures are used to provide a further understanding of the present document, and constitute a part of this specification, and they are used to explain the present document in combination with the embodiments of the present document, but not to limit the present document. In the accompanying drawings.

PREFERRED EMBODIMENTS OF THE INVENTION

Hereinafter the embodiments of the present document will be described in detail in combination with the accompanying drawings. It should be noted that, in the case of no conflict, embodiments and features in the embodiments of the present application could be arbitrarily combined with each other.

The First Embodiment

Figure 1:
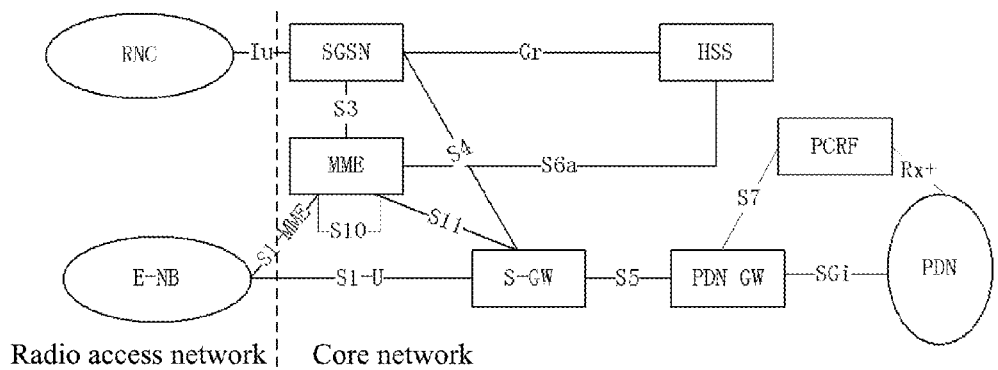
FIG. 1 is a structural diagram of an evolved packet domain system.
Figure 2A:
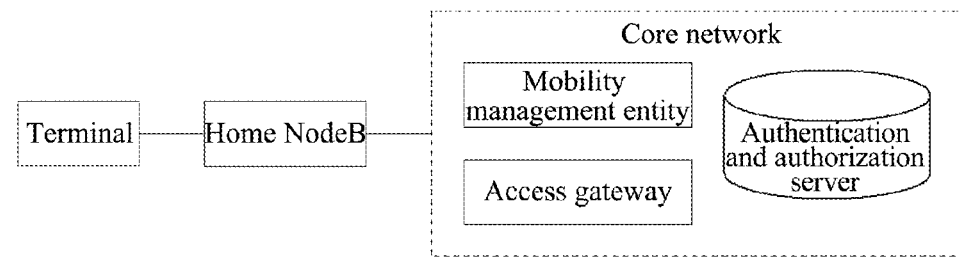
FIGS. 2a and 2b are schematic diagrams of a home nodeB accessing to the core network.
Figure 2B:
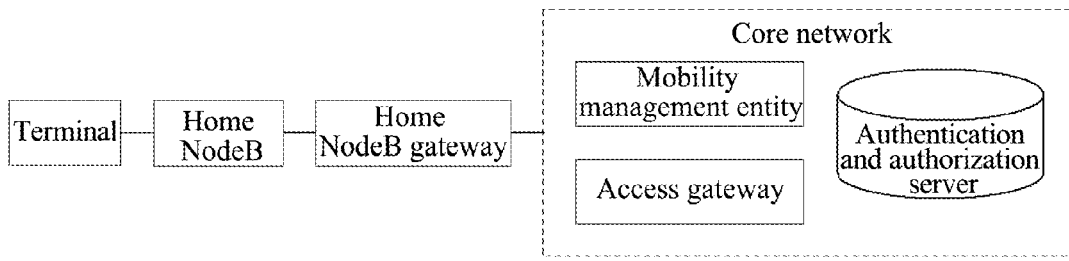
Figure 3:
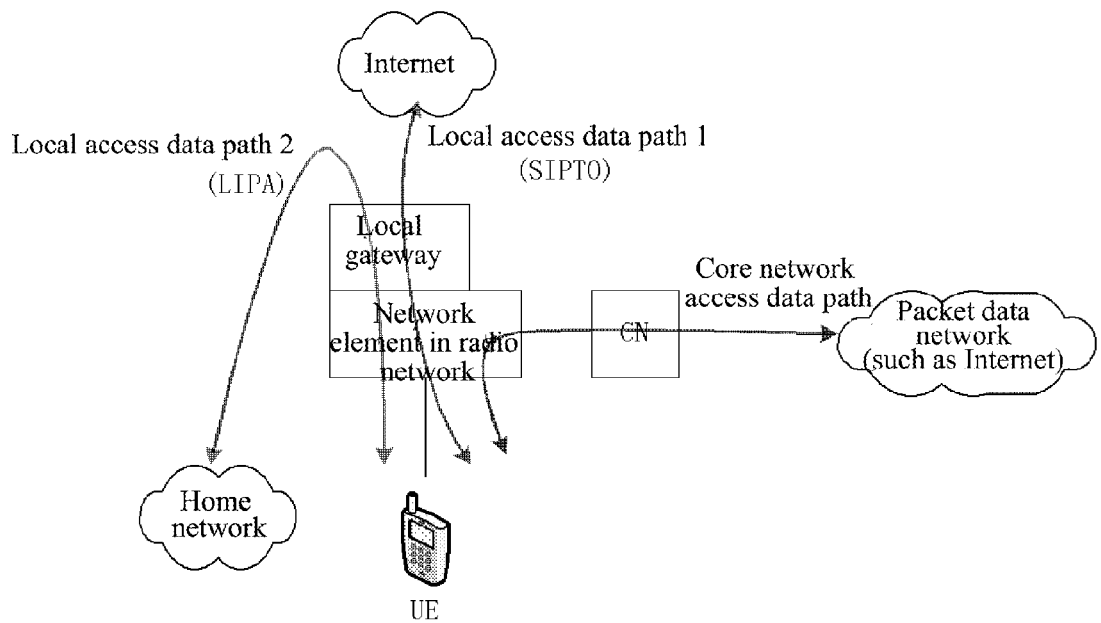
FIG. 3 is a schematic diagram of data flow paths of local access and traditional core network access.
Figure 4:
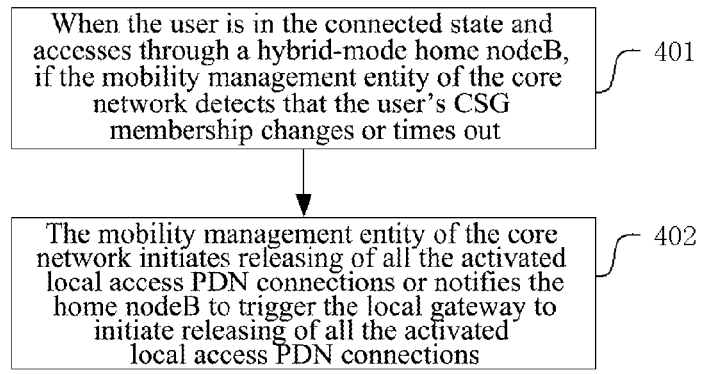
FIG. 4 is a flow chart in accordance with a first embodiment of the present document.

This embodiment is applied to a scenario in which the user does not subscribe the wild card APN (access point name), and as shown in FIG. 4, it comprises the following steps:

In step 401, when the user is in the connected state and accesses through a hybrid-mode home nodeB, if the mobility management entity of the core network detects that the user's CSG (closed subscriber group) membership changes or times out (for example, changes from a CSG subscriber to a Non-CSG subscriber);

the above-mentioned mobility management entity of the core network is the MME of the EPC network, and the SGSN in the GPRS network (including the SGSN supporting the Gn interface, the SGSN supporting the Gp interface or the SGSN supporting the S4 interface);

the user in the context refers to the user equipment, also known as the user terminal;

in step 402, the mobility management entity of the core network initiates releasing of all the activated local access PDN connections or notifies the home nodeB to trigger a local gateway to initiate releasing of all the activated local access PDN connections.

The mobility management entity notifies the home nodeB to trigger the local gateway to initiate releasing of all the activated local access PDN connections through an instruction in the S1 message or the Iu interface message. Upon receiving the triggering instruction, the home nodeB notifies the local gateway to initiate releasing of all the activated local access PDN connections via the Sxx interface or an internal interface. Wherein, the instruction in the S1 message (such as the E-RAB modification message) or the Iu interface message (such as the RAB modification message) may be the user's CSG membership or a local access deactivation instruction.

If it is the user's CSG membership received by the home nodeB, by comparing it with the previous CSG membership, the home nodeB finds out that the user's CSG membership changes from a CSG subscriber to a non-CSG subscriber, and triggers the local gateway to initiate releasing of the local access PDN connections.

If the home nodeB receives the local access deactivation instruction, the home nodeB directly triggers the local gateway to initiate releasing of the local access PDN connections.

The Second Embodiment

Figure 5:
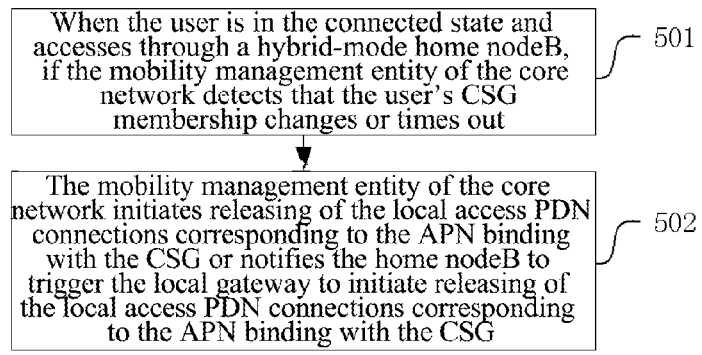
FIG. 5 is a flow chart in accordance with a second embodiment of the present document.

This embodiment is applied to a scenario in which the user subscribed the wild card APN, and as shown in FIG. 5, it comprises the following steps:

In step 501, when the user is in the connected state and accesses through a hybrid-mode home nodeB, if the mobility management entity of the core network detects that the user's CSG membership changes or times out (e.g., changes from a CSG subscriber to a non-CSG subscriber);

the above-mentioned mobility management entity of the core network is the MME of the EPC network, and the SGSN (including SGSN supporting the Gn interface, SGSN supporting the Gp interface or SGSN supporting the S4 interface) in the GPRS network;

in Step 502, the mobility management entity of the core network initiates releasing of the local access PDN connections corresponding to the APN binding with the CSG, or notifies the home nodeB to trigger the local gateway to initiate releasing of the local access PDN connections corresponding to the APN binding to the CSG.

The difference between the current embodiment and the first embodiment is that: since the user subscribed the wild card APN, when releasing the PDN connections, what are released are not all the APN connections but the local access APN connections corresponding to the APN binding with the CSG.

The mobility management entity notifies the home nodeB to trigger the local gateway to initiate releasing of the local access PDN connections corresponding to the APN binding to the CSG through the instruction in the S1 message or the Iu interface message. Upon receiving the triggering instruction, the home nodeB notifies the local gateway to initiate releasing of the local access PDN connections with the APN subscription via the Sxx interface or the internal interface. Wherein, the instruction in the S1 message (such as the E-RAB bearer modification message) or the Iu interface message (such as the RAB bearer modification message) may be the user's CSG membership or the local access deactivation instruction.

If the user's CSG membership is received by the home nodeB, by comparing it with the former CSG membership, the home nodeB finds out that the user's CSG membership changes from a CSG subscriber to a non-CSG subscriber, and triggers the local gateway to initiate releasing of the local access PDN connections.

If the home nodeB receives the local access deactivation instruction, the home nodeB directly triggers the local gateway to initiate releasing of the local access PDN connections.

The Third Embodiment

Figure 6:
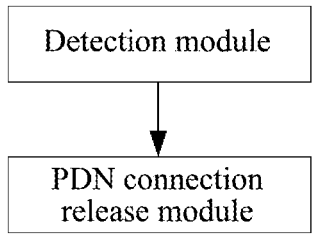
FIG. 6 is a schematic block diagram of a device according to a third embodiment of the present document.

This embodiment describes the device achieving the above-mentioned method, and as shown in FIG. 6, it comprises a detection module and a PDN connection release module, wherein:

the detection module is used to, when a user terminal is in the connected state and accesses through a hybrid-mode home nodeB, detect whether the user terminal's CSG membership changes or times out or not;

the PDN connection release module is used to, when the detection module detects that the user terminal's CSG membership changes or times out, initiate releasing of the local access PDN connections, or notify the home nodeB to trigger a local gateway to initiate releasing of the local access PDN connections.

The above-mentioned released local access PDN connections comprise: all the activated local access PDN connections, or the local access PDN connections corresponding to the APN binding with the CSG.

Preferably, the PDN connection release module is used to notify the home nodeB to trigger the local gateway to initiate releasing of the local access PDN connections by means of: through the instruction in the S1 message (e.g., the evolved radio access bearer modification request message) or the Iu interface message (e.g., the radio access bearer modification request message), notifying the home nodeB to trigger the local gateway to initiate releasing of the local access PDN connections. The above-mentioned instruction comprises: the user terminal's CSG membership information or the local access deactivation instruction.

In the following, specific application examples will be used to illustrate the method of the present document.

The First Application Example

Figure 7:
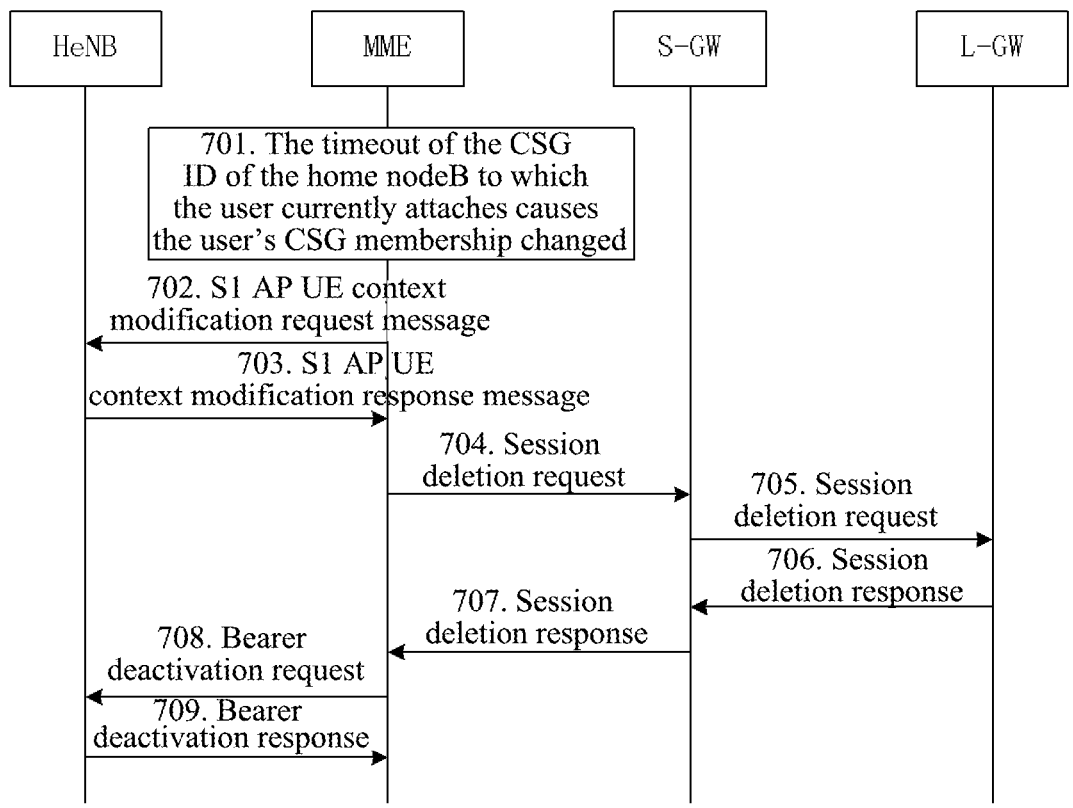
FIG. 7 is a flow chart in accordance with a first application example of the present document.

FIG. 7 is a flow chart in accordance with the first application example of the present document, and by taking the EPC network for example, the method for processing the local access connections when the user's local access subscription data changes will be described specifically as follows:

the present embodiment takes the timeout of the user's CSG (closed subscriber group) subscription stored in the Mobility Management entity (MME) of the core network for example to illustrate the method for processing the local access connections.

In Step 701, the mobility management entity (MME) of the core network stores the user's CSG subscription information, if the user is in the connected state and accesses to the network through a hybrid-mode home nodeB, when the MME detects that the timeout of the CSG ID corresponding to the home nodeB causes the user's CSG membership changed (from a CSG subscriber to a non-CSG subscribers), the MME needs to initiate releasing of the local access PDN connections.

Specifically, if the user does not subscribe the Wildcard APN, the MME initiates releasing of all the activated local access PDN connections. If the user subscribed the Wildcard APN, the MME initiates releasing of the local access PDN connections corresponding to the APN binding with the CSG in the session management context, while there is no treatment on those local access PDN connections corresponding to the APN not binding with the CSG in the session management context.

Each piece of CSG contract information comprises the timeout duration of the user using the CSG ID, when the timeout of a certain CSG ID subscribed by the user expires, it indicates that the user's CSG ID subscription is invalid, and the user's CSG membership changes from a CSG subscriber to a non-CSG subscriber.

In Step 702, the MME sends the HeNB the user's new CSG membership (changed from a CSG subscriber to a non-CSG subscriber) through the UE Context modification Request message in the S1 interface application protocol (hereinafter referred to as S1 AP), and the HeNB uses the new CSG Membership to perform air interface resource allocation;

In step 703, the HeNB responds with an S1 AP UE Context Modification Response message;

In step 704, the MME initiates a local access PDN connection deletion process based on the judgment result in step 701;

In steps 705-706, the user plane tunnels corresponding to the local access connections in the S-GW and the L-GW are released;

In step 707, the S-GW sends a session deletion response message to the MME;

In Steps 708-709, the air interface bearer corresponding to the local access connections is released.

The Second Application Example

Figure 8:
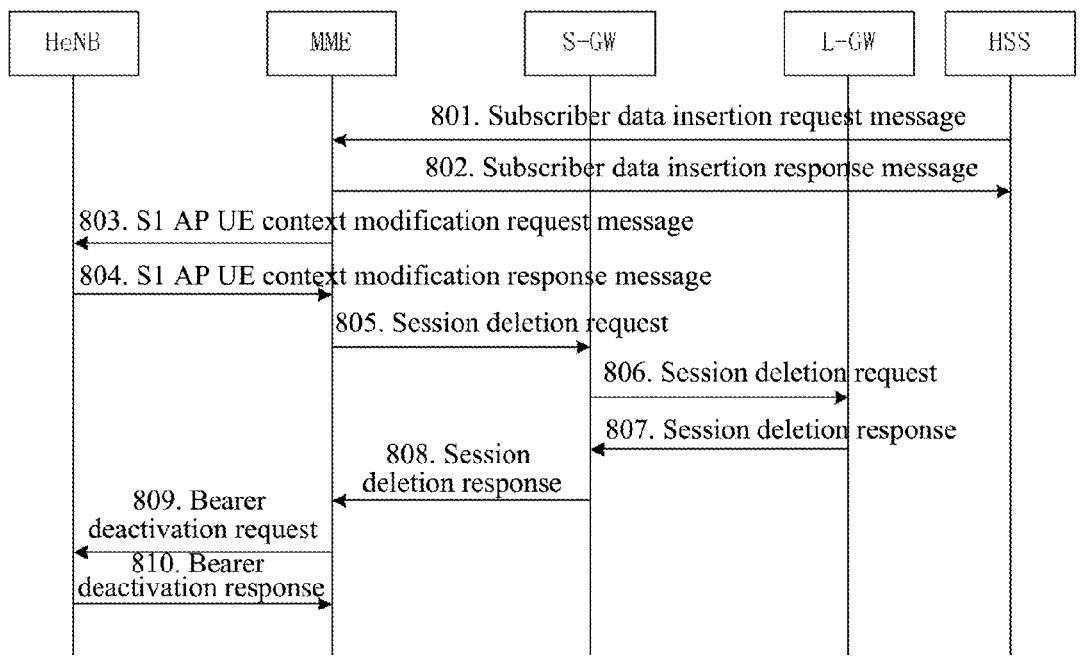
FIG. 8 is a flow chart in accordance with a second application example of the present document.

FIG. 8 is a flow chart in accordance with the second application example of the present document, and by taking the EPC network for example, the method for processing the local access connections when the user's local access subscription data changes is described specifically as follows:

this embodiment takes the subscription data update causing the user's CSG subscription saved in the MME of the core network invalid for example to describe the method for processing the local access connections.

In Step 801, the user's CSG subscription data in the HSS updates, and the HSS sends the MME a subscriber data insertion request message that carries the updated CSG subscription information;

according to the new CSG subscription message, the MME finds out that the user's current CSG membership changes, that is, the failure of the subscription of the CSG ID corresponding to the home nodeB to which the user in the connected state currently accesses causes the user's CSG membership changed (from a CSG subscriber to a non-CSG subscriber), the MME needs to initiate a local access PDN connection releasing process.

Specifically, if the user does not subscribe the Wildcard APN, the MME initiates releasing of all the activated local access PDN connections. If the user subscribed the Wildcard APN, the MME initiates releasing of the local access PDN connections corresponding to the APN binding with the CSG in the session management context, while there is no treatment on the local access PDN connections corresponding to the APN not binding with the CSG in the session management context.

In Step 802, the MME responds to the HSS with a subscriber data insertion response message;

step 803 to step 810 are the same as step 702 to step 709 in the first application example and are not described in detail here.

The Third Application Example

Figure 9:
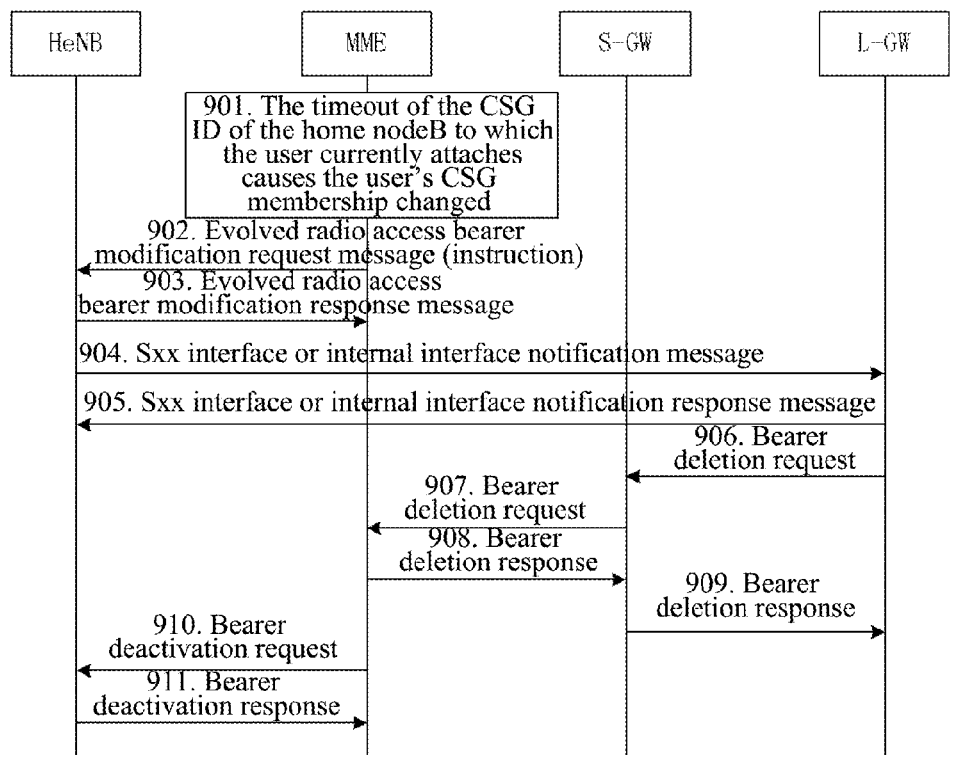
FIG. 9 is a flow chart in accordance with a third application example of the present document.

FIG. 9 is a flow chart in accordance with the third application example of the present document, by taking the EPC network for example, the method for processing the local access connections when the user's local access subscription data changes is described specifically as follows:

this embodiment takes the timeout of the user's CSG subscription stored in the MME of the core network for example to illustrate the method for processing the local access connections.

In Step 901, the MME of the core network stores the user's CSG subscription information, if the user is in the connected state and accesses to the network via a hybrid-mode home nodeB, when the MME detects that the timeout of CSG ID corresponding to the home nodeB causes the user's CSG membership changed (from a CSG subscriber to a non-CSG subscriber), the MME needs to instruct the HeNB to trigger the local gateway L-GW to initiate releasing of the local access PDN connections.

Specifically, if the user does not subscribe the Wildcard APN, the MME indicates the home nodeB to trigger the local gateway to initiate releasing of all the activated local access PDN connections. If the user subscribed the Wildcard APN, the MME instructs the home nodeB to trigger the local gateway to initiate releasing of the local access PDN connections corresponding to the APN binding with the CSG in the session management context, while there is no treatment on the local access PDN connections corresponding to the APN not binding with the CSG in the session management context.

In Step 902, the MME sends the HeNB the user's CSG membership or the local access connection deactivation instruction via the evolved radio access bearer (E-RAB) modification request message in the S1 interface message;

according to a judgment in step 901, if the MME needs to instruct the home nodeB to trigger the local gateway to initiate releasing of all the activated local access PDN connections, the user's CSG membership or the local access connection deactivation instruction is carried in the modification parameters of the radio bearers corresponding to all the local access PDN connections. If the MME needs to instruct the home nodeB to trigger the local gateway to initiate releasing of the local access PDN connections corresponding to the APN binding with the CSG in the session management context, the user's CSG membership or the local access connection deactivation instruction is carried in the modification parameters of the radio bearers corresponding to the local access PDN connections corresponding to the APN binding with the CSG.

The HeNB can find out the corresponding local access connections and its serving L-GW according to the radio bearers carrying the instruction, and trigger the L-GW to initiate releasing of the local access PDN connections.

It should be noted that:

If the MME uses the user's CSG membership parameter to indicate the HeNB to trigger the L-GW to initiate releasing of the local access PDN connections, the HeNB needs to compare the membership with the former CSG membership, if it finds out that the user changes from a CSG member to a non-CSG member, it triggers the L-GW to initiate releasing of the local access PDN connections corresponding to the radio bearers.

If the MME uses the local access connection deactivation parameter to indicate the HeNB to trigger the L-GW to initiate releasing of the local access PDN connections, after receiving the local access connection deactivation parameter instruction, the HeNB triggers the L-GW to initiate releasing of the local access PDN connections corresponding to the radio bearers.

In Step 903, the HeNB responds to the MME with an evolved radio access bearer modification response message;

In step 904, based on a judgment in step 902, the HeNB notifies the L-GW to initiate releasing of corresponding local access PDN connections via an Sxx interface between the HeNB and the L-GW or via an internal interface, wherein the Sxx interface is an interface not normalized yet;

In step 905, the L-GW replies with a notification response message;

In steps 906-909, the L-GW initiates a local access PDN connection releasing process;

In steps 910-911, the radio bearers corresponding to the local access PDN connections are released.

The Fourth Application Example

Figure 10:
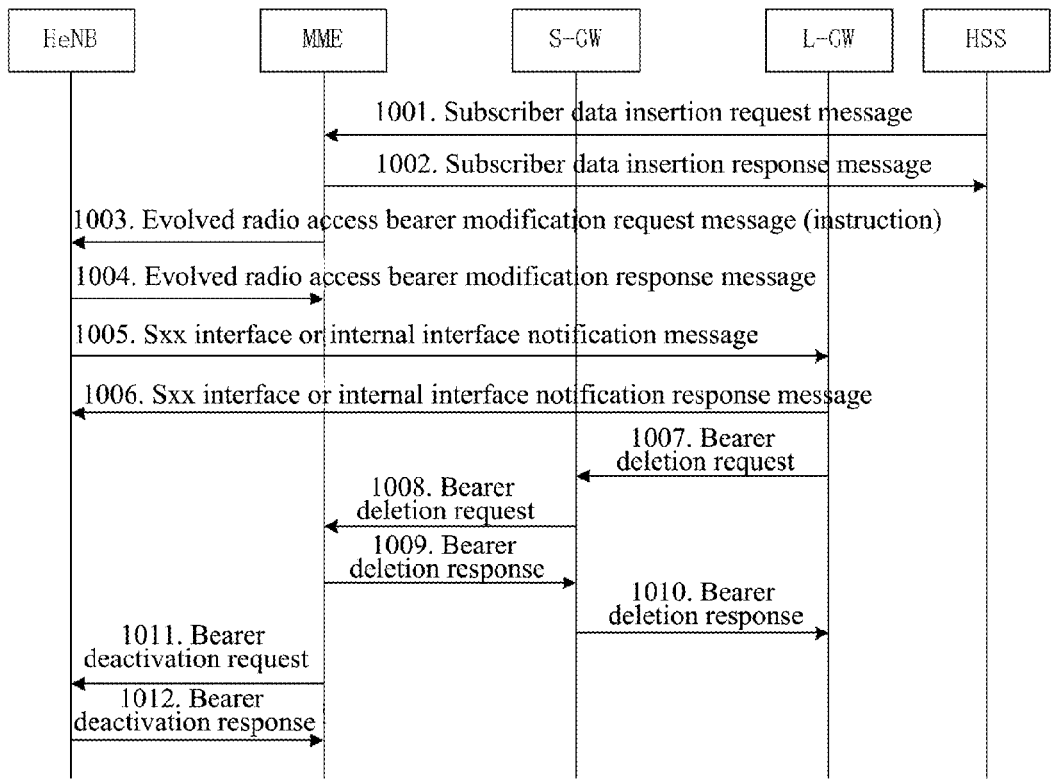
FIG. 10 is a flow chart in accordance with a fourth application example of the present document.

FIG. 10 is a flow chart in accordance with the fourth application example of the present document, by taking the EPC network for example, the method for processing the local access connections when the user's local access subscription data changes is described specifically as follows:

this embodiment takes the subscription data update causing the failure of the user's CSG subscription stored in the MME of the core network for example to explain the method for processing the local access connections.

In Step 1001, the user's CSG subscription data in the HSS updates, and the HSS sends the MME a subscriber data insertion request message carrying the updated CSG subscription information;

according to the new CSG subscription message, when the MME finds out that the user's current CSG membership changes, that is, the invalidation of the subscription the CSG ID corresponding to the home nodeB to which user in the connected state currently accesses causes the user's CSG membership changed (from a CSG subscriber to a non-CSG subscriber), the MME needs to instruct the HeNB to trigger the local gateway to initiate releasing of the local access PDN connections.

Specifically, if the user does not subscribe the Wildcard APN, the MME instructs the home nodeB to trigger the local gateway to initiate releasing of all the activated local access PDN connections. If the user subscribed the Wildcard APN, the MME instructs the home nodeB to trigger the local gateway to initiate releasing of the local access PDN connections corresponding to the APN binding with the CSG in the session management context, while there is no treatment on the local access PDN connections corresponding to the APN not binding with the CSG in the session management context.

In Step 1002, the MME responds to the HSS with a subscriber data insertion response message;

In step 1003, the MME sends the HeNB the user's new CSG membership or the local access connection deactivation instruction via the evolved radio access bearer modification request message in the S1 interface message;

according to a judgment in step 1001, if the MME needs to instruct the home nodeB to trigger the local gateway to initiate releasing of all the activated local access PDN connections, it carries the user's CSG membership or the local access connection deactivation instruction in the modification parameters of the radio bearers corresponding to all the local access PDN connections. If the MME needs to instruct the home nodeB to trigger the local gateway to initiate releasing of the local access PDN connections corresponding to the APN binding with the CSG in the session management context, it carries the user's CSG membership or the local access connection deactivation instruction in the modification parameters of the radio bearers corresponding to the local access PDN connections corresponding to the APN binding with the CSG.

The HeNB can find out the corresponding local access connections and its serving L-GW according to the radio bearers carrying the instruction, and triggers the L-GW to initiate releasing of the local access PDN connections.

It should be noted that:

If the MME uses the user's CSG membership parameter to instruct the HeNB to trigger the L-GW to initiate releasing of the local access PDN connections, the HeNB needs to compare the membership with the former CSG membership, and if it finds out that the user changes from a CSG member to a non-CSG member, it triggers the L-GW to initiate releasing of the local access PDN connections corresponding to the radio bearer.

If the MME uses the local access connection deactivation parameter to instruct the HeNB to trigger the L-GW to initiate releasing of the local access PDN connections, after receiving the local access connection deactivation parameter instruction, the HeNB triggers the L-GW to initiate releasing of the local access PDN connections corresponding to the radio bearers.

In Step 1004, the HeNB responds to the MME with an evolved radio access bearer modification response message;

In step 1005, based on a judgment in step 1003, the HeNB notifies the L-GW to initiate releasing of the corresponding local access PDN connections via the Sxx interface between the HeNB and the L-GW or via an internal interface. Wherein, the Sxx interface is an interface not normalized;

In step 1006, the L-GW replies with a notification response message;

In steps 1007-1010, the L-GW initiates a local access PDN connection releasing process;

In steps 1011-1012, the radio bearers corresponding to the local access PDN connections are released.

The Fifth Application Example

Figure 11:
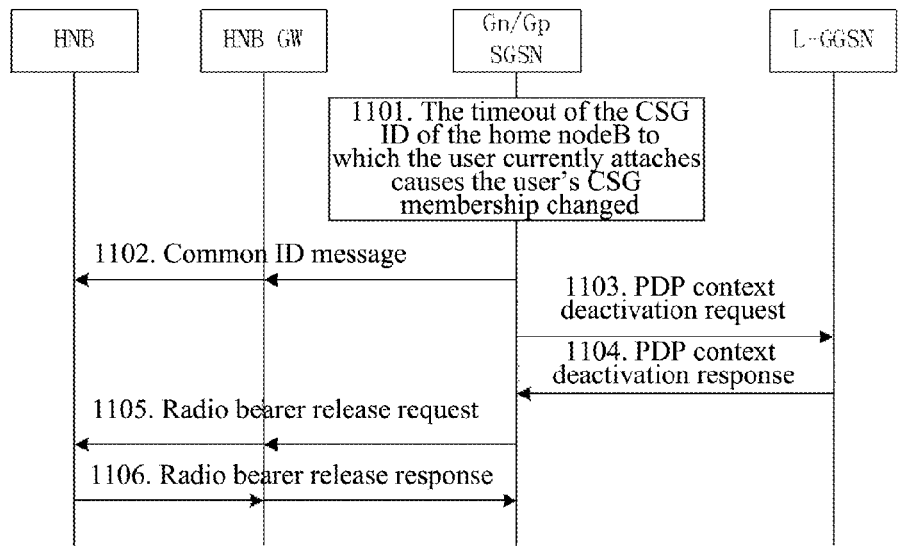
FIG. 11 is a flow chart in accordance with a fifth application example of the present document.

FIG. 11 is a flow chart in accordance with the fifth application example of the present document, by taking the GPRS network for example, the method for processing the local access connections when the user's local access subscription data changes is described specifically as follows:

this embodiment takes the timeout of the user's CSG subscription stored in the mobility management entity Gn/Gp SGSN (representing the SGSN supporting the Gn or Gp interface) of the core network as an example to describe the method for processing the local access connections.

In Step 1101, the mobility management entity Gn/Gp SGSN of the core network stores the user's CSG subscription information, and if the user is in the connected state and accesses to the network via a hybrid-mode home nodeB, when the Gn/Gp SGSN detects that the timeout of the CSG ID corresponding to the home nodeB causes the user's CSG membership changed (from a CSG subscriber to a non-CSG subscriber), the SGSN needs to initiate a local access PDN connection deactivation process.

Specifically, if the user does not subscribe the Wildcard APN, the SGSN initiate the deactivation of all the activated local access PDN connections. If the user subscribed the Wildcard APN, the SGSN initiates the deactivation of the local access PDN connections corresponding to the APN binding with the CSG in the session management context, while there is no treatment on those local access PDN connections corresponding to the APN not binding with the CSG in the session management context.

In Step 1102, the Gn/Gp SGSN uses the Iu interface Common ID (common identifier) message to send the HNB the user's new CSG membership (from a non-CSG CSG subscribers into subscriber) via the HNB GW, so that the HNB can use the new CSG membership to perform the air interface resource allocation;

In step 1103, based on a judgment result in step 1101, the Gn/Gp SGSN initiates the local access connection deactivation process, and the Gn/Gp SGSN sends the L-GGSN a PDP context deactivation request message;

In step 1104, the L-GGSN replies with a PDP context deactivation response message;

In steps 1105-1106, the radio bearers corresponding to the local access connections are released.

The Sixth Application Example

Figure 12:
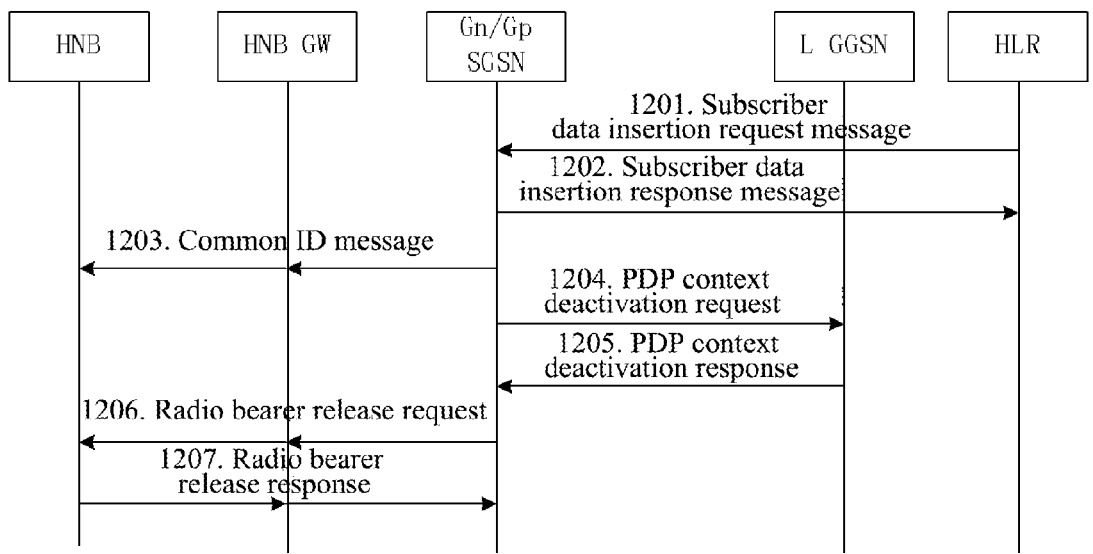
FIG. 12 is a flow chart in accordance with a sixth application example of the present document.

FIG. 12 is a flow chart in accordance with the sixth application example in the present document, and by taking the GPRS network for example, the method for processing the local access connections when the user's local access subscription data changes is described specifically as follows:

this embodiment takes the subscription data update causing the invalidation of user's CSG subscription stored in the mobility management entity Gn/Gp SGSN of the core network as an example to illustrate the method for processing the local access connections.

In Step 1201, the user's CSG subscription in the HLR updates, and the HLR sends the Gn/Gp SGSN a subscriber data insertion request message carrying the updated CSG subscription information;

when the Gn/Gp SGSN finds out that the user's current CSG membership changes according to the new CSG subscription message, that is, the invalidation of the subscription of the CSG ID corresponding to the home nodeB to which the user in the connected state currently accesses causes the user's CSG membership changed (from a CSG subscriber to a non-CSG subscriber), the Gn/Gp SGSN needs to initiate a local access connection deactivation process.

Specifically, if the user does not subscribe the Wildcard APN, the Gn/Gp SGSN initiates the deactivation of all the activated local access PDN connections. If the user subscribed the Wildcard APN, the MME initiates the deactivation of the local access PDN connections corresponding to the APN binding with the CSG in the session management context, while there is no treatment on those local access PDN connections corresponding to the APN not binding with the CSG in the session management context.

In Step 1202, the Gn/Gp SGSN responds to the HLR with a subscriber data insertion response message.

Step 1203 to step 1207 are the same as step 1102 to step 1106 in the fifth application example, and are not described in detail here.

The Seventh Application Example

Figure 13:
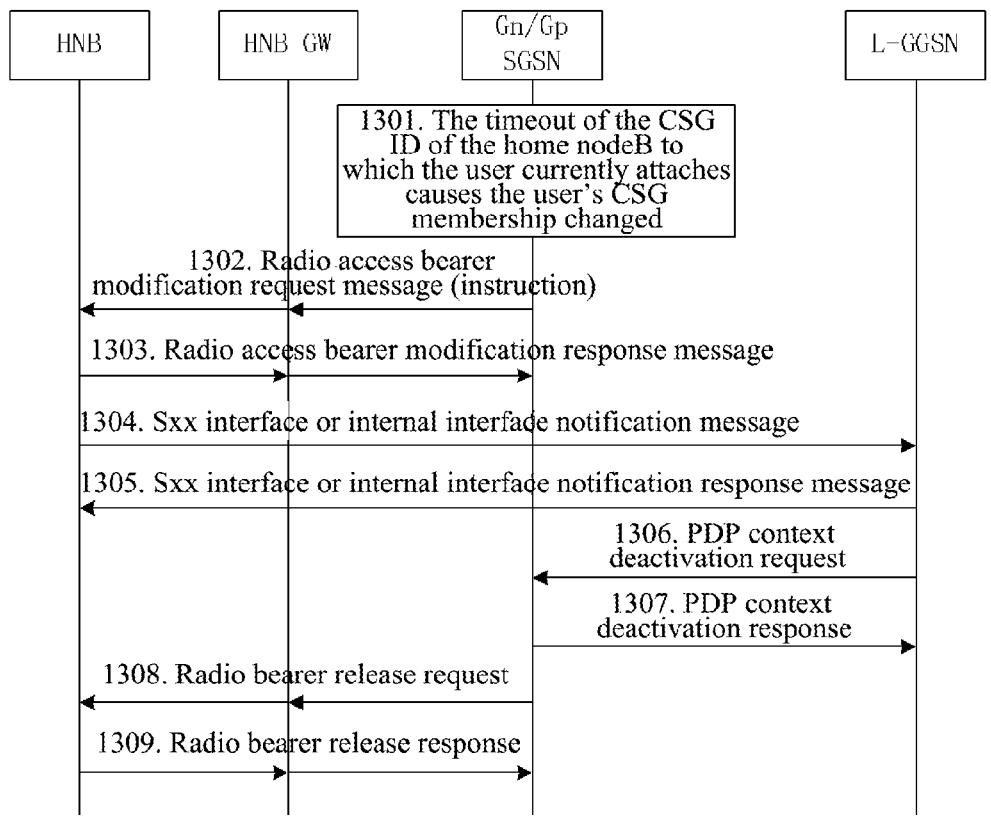
FIG. 13 is a flow chart in accordance with a seventh application example of the present document.

FIG. 13 is a flow chart in accordance with the seventh application example of the present document, by taking the GPRS network for example, the method for processing the local access connections when the user's local access subscription data changes is described specifically as follows:

the present embodiment takes the timeout of the user's CSG subscription stored in the mobility management entity Gn/Gp SGSN of the core network for example to describe the method for processing the local access connections.

In Step 1301, the mobility management entity Gn/Gp SGSN of the core network stores the user's CSG subscription information, if the user is in the connected state and accesses to the network via a hybrid mode home nodeB, when the Gn/Gp SGSN detects that the timeout of the CSG ID corresponding to the home nodeB causes the user's CSG membership changed (from a CSG subscriber to a non-CSG subscriber), the Gn/Gp SGSN needs to instruct the HNB to trigger the local gateway to initiate the local access PDN connection deactivation.

Specifically, if the user does not subscribe the Wildcard APN, then the Gn/Gp SGSN indicates the home nodeB to trigger the local gateway to initiate the deactivation of all the activated local access PDN connections. If the user subscribed the Wildcard APN, the Gn/Gp SGSN instructs the home nodeB to trigger the local gateway to initiate the deactivation of the local access PDN connections corresponding to the APN binding with the CSG in the session management context, while there is no treatment on those local access PDN connections corresponding to the APN not binding with the CSG in the session management context.

In Step 1302, the Gn/Gp SGSN sends the user's CSG membership or the local access connection deactivation instruction via the HNB GW to the HNB through the radio access bearer (RAB) modification request message in the Iu interface message;

according to a judgment in step 1301, if the Gn/Gp SGSN needs to instruct the home nodeB to trigger the local gateway to initiate releasing of all the activated local access PDN connections, the user's CSG membership or local access connection deactivation instruction is carried in the modification parameters of the radio bearers corresponding to all the local access PDN connections. If the Gn/Gp SGSN needs to instruct the home nodeB to trigger the local gateway to initiate releasing of the local access PDN connections corresponding to the APN binding with the CSG in the session management context, the user's CSG membership or local access connection deactivation instruction is carried in the modification parameters of the radio bearers corresponding to the local access PDN connections corresponding to the APN binding with the CSG.

The HNB can find out the corresponding local access connections and its serving L-GGSN according to the radio bearers carrying the above-mentioned instruction, and trigger the L-GGSN to initiate the local access PDN connection deactivation.

It should be noted that:

if the Gn/Gp SGSN uses the user's CSG membership parameter to instruct the HNB to trigger the L-GGSN to initiate the local access PDN connection deactivation, the HNB needs to compare the CSG membership with the former CSG membership, if it finds out that the user changes from a CSG member to a non-CSG member, it triggers the L-GGSN to initiate the deactivation of the local access PDN connections corresponding to the radio bearers.

If the Gn/Gp SGSN uses the local access connection deactivation parameter to instruct the HNB to trigger the L-GGSN to initiate the local access PDN connection deactivation, after receiving the local access connection deactivation parameter instruction, the HNB triggers the L-GGSN to initiate the deactivation of the local access PDN connections corresponding to the radio bearers.

In Step 1303, the HNB responds with a radio access bearer modification response message;

In step 1304, based on a judgment in step 1302, the HNB notifies the L-GGSN to initiate releasing of the corresponding local access PDN connections via the Sxx interface between the HNB and the L-GGSN or via an internal interface, wherein the Sxx interface is an interface not normalized;

In step 1305, the L-GGSN replies with a notification response message;

In step 1306-1307, the L-GGSN initiates a PDP context deactivation process;

In steps 1308-1309, the radio bearers corresponding to the local access PDN connections are released.

The Eighth Application Example

Figure 14:
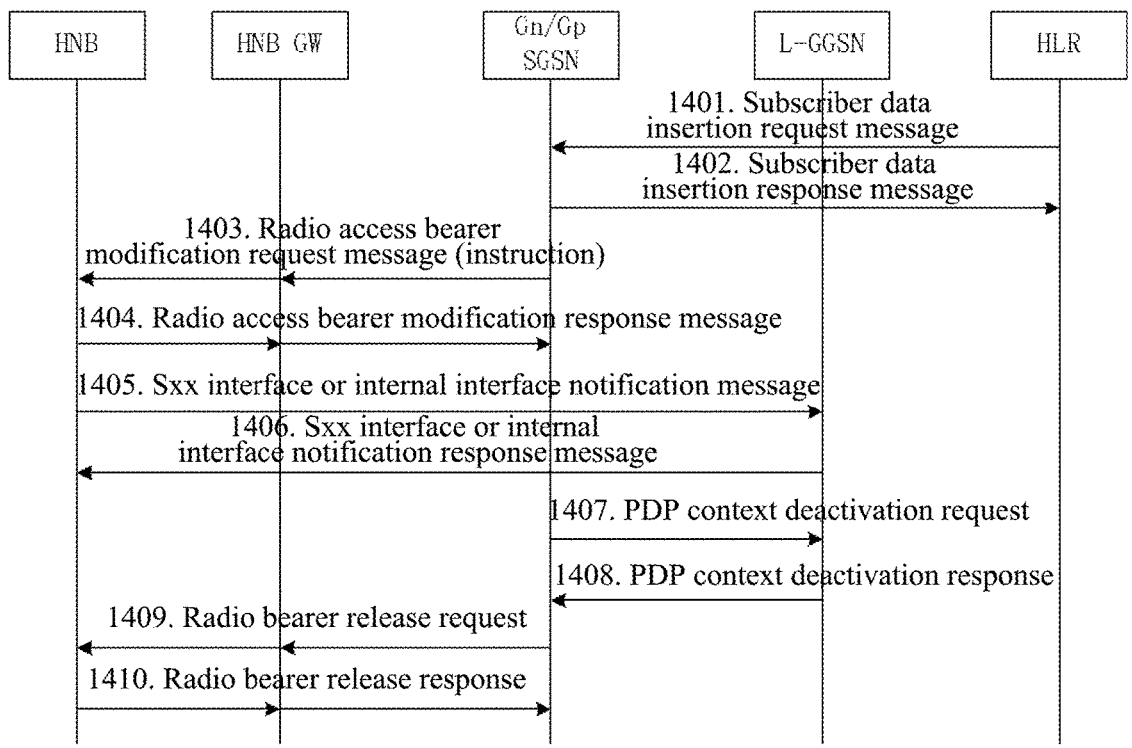
FIG. 14 is a flow chart in accordance with an eighth application example of the present document.

FIG. 14 is a flow chart in accordance with the eighth application example of the present document, by taking the GPRS network for example, the method for processing the local access connections when the local access subscription data changes is described specifically as follows:

this embodiment takes the subscription data update causing the invalidation of the user's CSG subscription stored in the mobility management entity Gn/Gp SGSN of the core network as an example to describe the method for processing the local access connections.

In Step 1401, the user's CSG subscription data in the HLR updates, the HLR sends a subscriber data insertion request message to the Gn/Gp SGSN, and the message carries the updated CSG subscription information;

according to the new CSG subscription message, when the Gn/Gp SGSN finds out that the user's current CSG membership changes, that is, the invalidation of the subscription of the CSG ID corresponding to the home nodeB to which the user in the connected state currently accesses causes the user's CSG membership changed (from a CSG subscriber to a non-CSG subscriber), the Gn/Gp SGSN instructs the HNB to trigger the local gateway to initiate the local access PDN connection deactivation.

Specifically, if the user does not subscribe the Wildcard APN, the Gn/Gp SGSN instructs the home nodeB to trigger the local gateway to initiate the deactivation of all the activated local access PDN connections. If the user subscribed the Wildcard APN, the Gn/Gp SGSN instructs the home nodeB to trigger the local gateway to initiate the deactivation of the local access PDN connections corresponding to the APN binding with the CSG in the session management context, while there is no treatment on the local access PDN connections corresponding to the APN not binding with the CSG in the session management context.

In Step 1402, the Gn/Gp SGSN returns a subscriber data insertion response message to the HLR;

In step 1403, the Gn/Gp SGSN sends the user's CSG membership or the local access connection deactivation instruction via the HNB GW to the HNB through the radio access bearer modification request message in the Iu interface message;

according to a judgment in step 1401, if the Gn/Gp SGSN needs to instruct the home nodeB to initiate the local gateway to trigger releasing of all the activated local access PDN connections, the user's CSG membership or the local access connection deactivation instruction is carried in the modification parameters of the radio bearers corresponding to all the local access PDN connections. If the Gn/Gp SGSN needs to instruct the home nodeB to trigger the local gateway to initiate releasing of the local access PDN connections corresponding to the APN binding with the CSG in the session management context, the user's CSG membership or the local access connection deactivation instruction is carried in the modification parameters of the radio bearers corresponding to the local access PDN connections corresponding to the APN binding with the CSG.

The HNB can find out the corresponding local access connections and its serving L-GGSN according to the radio bearers carrying the instruction, and trigger the L-GGSN to initiate the local access PDN connection deactivation.

It should be noted that:

if the Gn/Gp SGSN uses the user's CSG membership parameter to instruct the HNB to trigger the L-GGSN to initiate the local access PDN connection deactivation, the HNB needs to compare the CSG membership with the former CSG membership, if it finds out that the user changes from a CSG member to a non-CSG member, it triggers the L-GGSN to initiate the deactivation of the local access PDN connections corresponding to the radio bearers.

If the Gn/Gp SGSN uses the local access connection deactivation parameter to instruct the HNB to trigger the L-GGSN to initiate the local access PDN connection deactivation, after receiving the local access connection deactivation parameter instruction, the HNB triggers the L-GGSN to initiate the deactivation of the local access PDN connections corresponding to the radio bearers.

In Step 1404, the HNB responds with a radio access bearer modification response message;

In step 1405, according to a judgment in step 1403, the HNB notifies the L-GGSN to initiate releasing of the corresponding local access PDN connections via the Sxx interface between the HNB and the L-GGSN or via an internal interface, wherein the interface Sxx is an interface not normalized;

In step 1406, the L-GGSN replies with a notification response message;

In steps 1407-1408, the L-GGSN initiates a PDP context deactivation process;

In steps 1409-1410, the radio bearers corresponding to the local access PDN connections are released.

It should be noted that, the processing for the local access PDN connections in the case of the EPC network S4 SGSN is the same as that in the first to fourth embodiments, and the difference is that the Iu interface notifications use different messages (it is the same as that in the fifth to eighth application examples), which is not described in details here, and the examples should have the same coverage.

Those ordinarily skilled in the art can understand that all or part of steps of the above-mentioned method may be completed by programs instructing the relevant hardware, and the programs may be stored in a computer-readable storage medium, such as read only memory, magnetic or optical disk. Optionally, all or part of the steps of the above-mentioned embodiments may also be implemented by using one or more integrated circuits. Accordingly, each module/unit in the above-mentioned embodiment may be realized in the form of hardware or in the form of software function module. The present document is not limited to any specific form of hardware and software combinations.

Of course, the present document may also have a variety of other embodiments, and without departing from the spirit and essence of the present document, those skilled in the art can make all kinds of corresponding changes and modifications in accordance with the present document, and these corresponding changes and modifications should belong to the protection scope of the appended claims of the present document.

INDUSTRIAL APPLICABILITY

When the local access subscription information changes dynamically, especially when the user terminal changes from a CSG subscriber to a non-CSG subscriber, the method and device in accordance with the embodiments of the present document can be used to enable the network side to release local access connections, thus avoiding unnecessary resource waste.

What is claimed is:

1. A method for processing local access connections, comprising: a mobility management entity of a core network storing closed subscriber group (CSG) subscription information and the mobility management entity of the core network detecting whether CSG membership of a user terminal changes or times out when the user terminal is in a connected state and accesses through a hybrid-mode home nodeB, and when the mobility management entity of the core network detects that the CSG membership of the user terminal changes or times out, the mobility management entity of the core network initiating releasing of affected Local Internet Protocol (IP) Access (LIPA) connections, or the mobility management entity of the core network notifying the home nodeB to trigger a Local Gateway (L-GW) to initiate releasing of the affected LIPA connections;

wherein when the user terminal does not subscribe to a Wildcard Access Point Name (APN), the mobility management entity initiates releasing of all activated LIPA connections, when the user terminal has subscribed to the Wildcard APN, the mobility management entity initiates releasing of the LIPA connections corresponding to an APN binding with the CSG in a session management context, but does not release the LIPA connections corresponding to an APN not binding with the CSG in the session management context.

2. The method of claim 1, wherein,
the closed subscriber group membership of the user terminal changing or timing out, comprises: the user terminal changing from a closed subscriber group subscriber to a non-closed subscriber group subscriber.

3. The method of claim 2, wherein,
the mobility management entity of the core network notifying the home nodeB to trigger the L-GW to initiate releasing of the LIPA connections, comprises:
the mobility management entity notifying the home nodeB to trigger the L-GW to initiate releasing of the LIPA connections via an instruction in an S1 message or an Iu interface message.

4. The method of claim 1, wherein,
the mobility management entity of the core network notifying the home nodeB to trigger the L-GW to initiate releasing of the LIPA connections, comprises:
the mobility management entity notifying the home nodeB to trigger the L-GW to initiate releasing of the LIPA connections via an instruction in an S1 message or an Iu interface message.

5. The method of claim 4, wherein,
the S1 message comprises: an evolved radio access bearer modification request message; the Iu interface message comprises: a radio access bearer modification request message.

6. The method of claim 4, wherein,
the instruction comprises: information of the current closed subscriber group membership of the user terminal;
after the home nodeB receives the instruction, if the home nodeB determines that the closed subscriber group membership of the user terminal has changed through a comparison, the home nodeB triggers the L-GW to initiate releasing of the LIPA connections.

7. The method of claim 4, wherein,
the instruction comprises: a local access deactivation instruction;

after the home nodeB receives the instruction, the home nodeB directly triggers the L-GW to initiate releasing of the LIPA connections.

8. The method of claim 1, wherein the home nodeB notifies the L-GW to initiate releasing of corresponding LIPA connections via an interface between the home nodeB and the L-GW or via an internal interface.

9. A device for processing local access connections, comprising a detection module and a packet data network (PDN) connection release module, wherein:
the device is comprised in a mobility management entity of a core network, and the mobility management entity of the core network stores closed subscriber group (CSG) subscription information;
the detection module is configured to: when a user terminal is in a connected state and accesses through a hybrid mode home nodeB, detect whether a closed subscriber group (CSG) membership of the user terminal changes or times out or not; and
the packet data network connection release module is configured to: when the detection module detects that the closed subscriber group membership of the user terminal changes or times out, initiate releasing of affected Local Internet Protocol (IP) Access (LIPA) connections, or notify the home nodeB to trigger a Local Gateway (L-GW) to initiate releasing of the affected LIPA connections;
wherein when the user terminal does not subscribe to a Wildcard Access Point Name (APN), the device initiates releasing of all activated LIPA connections, when the user terminal has subscribed to the Wildcard APN, the device initiates releasing of the LIPA connections corresponding to an APN binding with the CSG in a session management context, but does not release the LIPA connections corresponding to an APN not binding with the CSG in the session management context.

10. The device of claim 9, wherein,
the closed subscriber group membership of the user terminal changing or timing out, comprises: the user terminal changing from a closed subscriber group subscriber to a non-closed subscriber group subscriber.

11. The device of claim 10, wherein,
the packet data network connection release module is configured to: notify the home nodeB to trigger the L-GW to initiate releasing of the LIPA connections by means of: the packet data network connection release module notifying the home nodeB to trigger the L-GW to initiate releasing of the LIPA connections via an instruction in an S1 message or an Iu interface message.

12. The device of claim 9, wherein,
the packet data network connection release module is configured to: notify the home nodeB to trigger the L-GW to initiate releasing of the LIPA connections by means of: the packet data network connection release module notifying the home nodeB to trigger the L-GW to initiate releasing of the LIPA connections via an instruction in an S1 message or an Iu interface message.

13. The device of claim 12, wherein,
the S1 message comprises: an evolved radio access bearer modification request message; the Iu interface message comprises: a radio access bearer modification request message.

14. The device of claim 12, wherein,
the instruction comprises: information of the closed subscriber group membership of the user terminal or a local access deactivation instruction.

15. The device of claim 9, wherein the home nodeB notifies the L-GW to initiate releasing of corresponding LIPA connections via an interface between the home nodeB and the L-GW or via an internal interface.

* * * * *